United States Patent [19]

Messmann et al.

[11] 3,959,787
[45] May 25, 1976

[54] REFRIGERATION ALARM
[75] Inventors: Helen Messmann; Carl T. Pfeufer, both of Center Point, Tex.
[73] Assignee: Lawrence Peska Associates, Inc., New York, N.Y. ; a part interest
[22] Filed: May 8, 1975
[21] Appl. No.: 575,839

[52] U.S. Cl. .............................. 340/227 R; 116/4; 116/114 Y; 62/125
[51] Int. Cl.² .................... G08B 21/00; F25B 49/00
[58] Field of Search ......... 340/227 R, 227.1, 228 R; 335/208, 146; 62/125; 116/4, 114 Y, 173

[56] References Cited
UNITED STATES PATENTS

| | | | |
|---|---|---|---|
| 2,433,024 | 12/1947 | Burgess | 340/227 R |
| 2,741,099 | 4/1956 | Beane | 340/227.1 X |
| 2,923,786 | 2/1960 | Jones | 340/227.1 X |
| 2,943,308 | 6/1960 | Westphal | 340/283 X |
| 3,028,586 | 4/1962 | Reba | 340/227.1 |
| 3,753,259 | 8/1973 | Donovan | 340/228 R |

*Primary Examiner*—John W. Caldwell
*Assistant Examiner*—William M. Wannisky
*Attorney, Agent, or Firm*—Jack D. Slobod

[57] ABSTRACT

An alarm for signalling an improperly high temperature in a refrigerated container such as a freezer includes a thermostat within the container and an alarm unit magnetically mounted on the outside of the container. The alarm unit includes batteries for energizing a lamp and a buzzer within the unit in response to the thermostat. The alarm unit also includes a spring biased flag pivotly mounted thereon which is normally retained in a cocked position by a finger carried by a solenoid. The solenoid is energized by the battery to deploy the flag and thereby provide an enduring indication of alarm after the batteries have died out or the temperature has returned to normal.

2 Claims, 4 Drawing Figures

REFRIGERATION ALARM

FIELD OF THE INVENTION

The present invention relates generally to signalling devices, and in its more particular aspects relates to a device for providing plural indications of the failure of a refrigeration system including an enduring indication.

BACKGROUND OF THE INVENTION

The use of frozen food in the home is ever increasing. It is well known that if power to the freezer should lapse or if the freezer door is accidentally left open, the food therein may thaw to a point where the food must immediately be used since it will spoil upon refreezing. Accordingly, it is quite important to be apprised as quickly as possible by a suitable signal of an abnormally high temperature in a freezer so that corrective action could be taken to save the food therein. Of particular importance is a lapse of power, which is of sufficient length to thaw the food, followed by a return of power. If one who has been away from home or sleeping during the power lapse, doesn't notice that an electrical clock has lost time, the food in the freezer will be refrozen and consequently ruined.

While various alarm devices for refrigeration systems are known in the prior art, these systems are apparently too expensive to be incorporated in a home freezer or refrigerator. Also none of the prior art refrigeration alarm systems of which we are aware provide an enduring indication of a thawing condition which indication persists after the condition corrects itself.

OBJECTS OF THE INVENTION

It is an object of the present invention to provide an alarm system for a refrigerated container which will immediately apprise the housewife of an abnormally high temperature in the freezer if she is anywhere in the home.

It is a further object of the present invention to provide an alarm system for a freezer, an enduring indication of a thawing temperature irrespective of whether the temperature subsequently returns to normal.

It is yet a further object of the present invention to provide a temperature alarm apparatus which is simple, inexpensive and easily installed on a freezer or refrigerator.

SUMMARY OF THE INVENTION

The aforementioned and other objects of the present invention are satisfied by providing an electrical temperature sensor having a hook for being easily secured within a refrigerated container. The sensor is wired to an alarm housing having a magnetic slab on its side for holding the housing to the external side of the refrigerated container. The alarm housing includes batteries which energize a buzzer in response to the sensor for providing a signal audible throughout the home of a high temperature condition in the container. A lamp on the unit is also lit in response to the sensor. For providing an enduring indication of an abnormally high temperature within the container, which indication persists even after the temperature returns to normal or the batteries die out from energizing the lamp and buzzer, a flag is provided pivotly mounted on the housing. The flag is spring biased to a deployed position but is held in a cocked position by a solenoid releasable catch. The solenoid is energized by the batteries in response to the sensor to release and thereby deploy the flag.

Other objects, features and advantages of the present invention will become apparent upon a perusal of the following detailed description of the preferred embodiment thereof when taken in conjunction with the appended drawing wherein.

DETAILED DESCRIPTION

Figure 1:
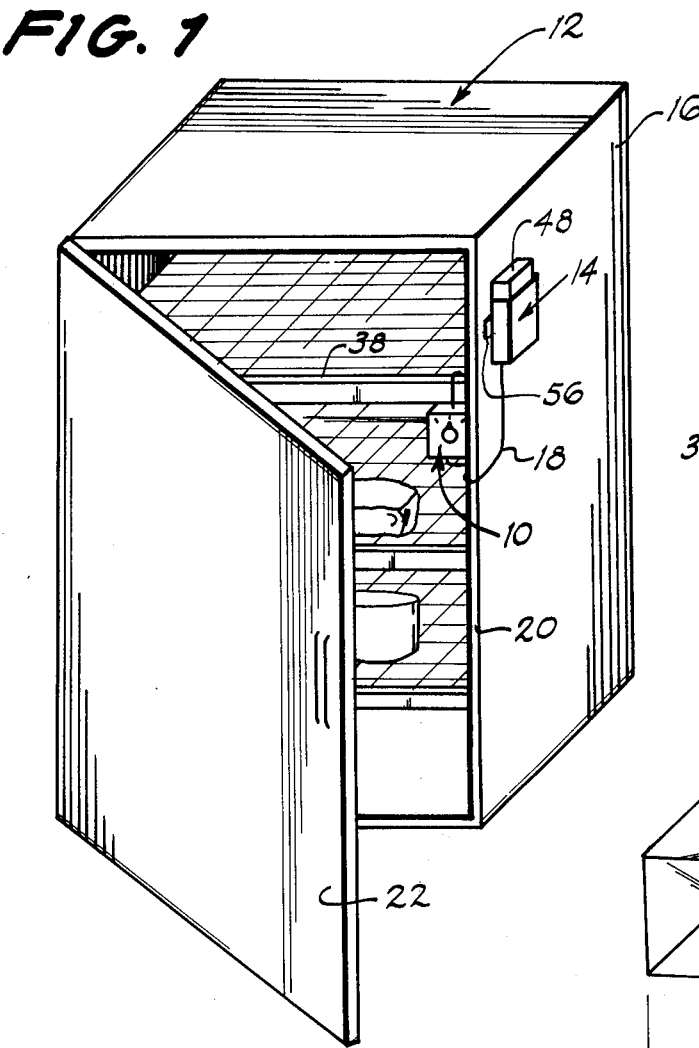
FIG. 1 is a pictorial presentation of the alarm apparatus of the present invention in place on an upright freezer. The apparatus consists of a unit inside and a unit outside the freezer.

Referring to FIG. 1, the alarm system of the present invention comprises an electrical temperature sensor 10, configured as a thermostat of the usual bi-metalic contact type, within an upright freezer 12 and an alarm unit 14 secured to the side 16 of the freezer 12. Sensor 10 and alarm unit 14 are interconnected by a two wire cable 18, which passes out of freezer 12 over the side edge 20 of the freezer door opening. Cable 18 is provided of sufficiently small diameter that the usual gasket on the freezer edge 20 or on the freezer door 22 will seal around the cable.

Figure 2:
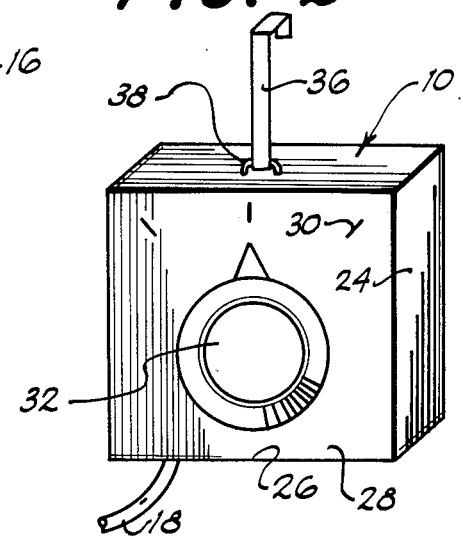
FIG. 2 is an enlarged pictorial presentation of the unit within the freezer in FIG. 1.

Referring now also to FIG. 2, the sensor thermostat unit 10 is provided in a rectangular housing 24 with the cable 18 emanating from a bottom surface 26 thereof. The front face 28 of housing 24 is provided with angular graduations 30 cooperating with a knob 32 mounted centrally on face 28 for selecting the temperature at which the sensor 10 will complete a circuit between the pair of wires in cable 18 to cause alarm unit 14 to provide an alarm indication.

For easily securing the sensor 10 within the freezer 12, the top face 34 of housing 24 is provided with a hook 36 of ribbon sheet metal stock, which is secured to an upstanding loop 38 on top face 34. Hook 36 is configured to rest on the horizontal front lip 38 of a freezer shelf. Further, hook 36 is oriented so that the sensor unit 10 may be suspended from shelf lip 38 with the front face 28 visible in the freezer door opening.

Figure 3:
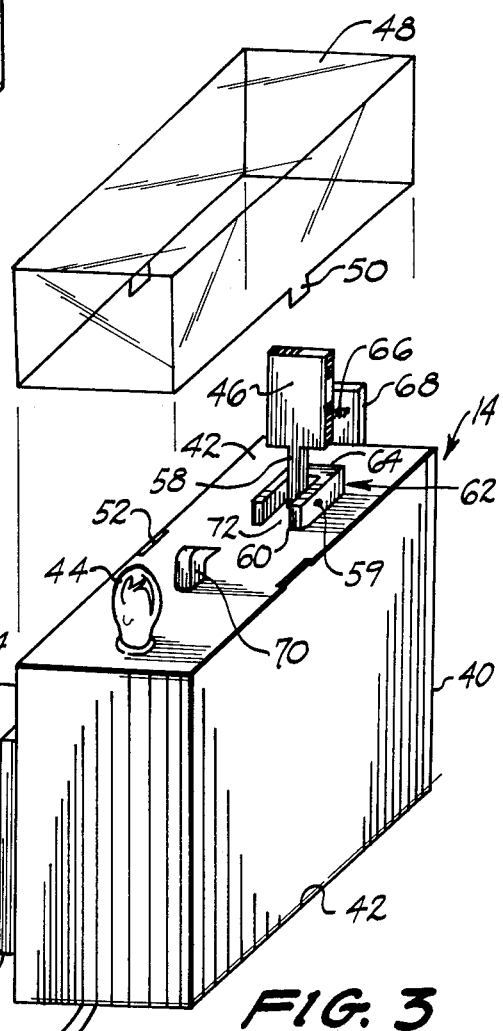
FIG. 3 is an enlarged pictorial presentation of the unit outside the freezer in FIG. 1.

Referring to FIGS. 3 and 9, the alarm unit 14 will now be described in detail. The alarm unit 14 comprises a rectangular housing 40 having a bottom surface 42 out of which emanates the cable 18. On a top surface of housing 40 opposing bottom surface 42 there are mounted a lamp 44 and a deployable flag 46 preferably colored red. The flag 46 is shown in FIG. 3 in a deployed position and in FIG. 4 in a stowed or cocked position. A removable transparent plastic rectangular dust cover 48 is provided to cover the lamp 44 and flag 46. Dust cover 48 is retained on top of housing 40 by a pair of tabs 50 which project downward from opposite side surfaces of cover 48 and are received in opposed slots 52 in top surface 42.

The back surface 54 of housing 40 is provided with a magnetic slab 56, as of ferrite, secured thereto for holding alarm unit 40 on the side 16 of freezer 12 (FIG. 1).

The flag 46 has a shank or post 58 which is pivotly mounted on top surface 42. Shank 58 is journalled on a transverse pin 59 between the opposed legs 60 of a U shaped member 62 secured to top surface 42. The connecting leg 64, between legs 60, provides a stop against shank 58 permitting the flag 46 to stand in a vertical or deployed position as shown in FIG. 3. The flag 46 is urged to this upstanding or deployed position by a spring 66 secured between the flag and an upstanding plate 68 carried by top face 42 directly behind connecting leg 64.

Figure 4:
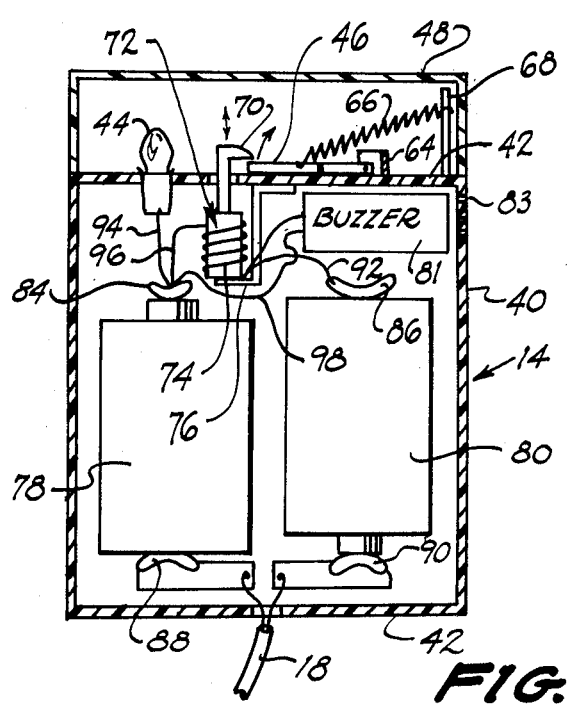
FIG. 4 is a side elevation view in cross-section of the unit in FIG. 3.

For retaining the flag 46 in a stowed or cocked position, as shown in FIG. 4, a vertically moveable catch or finger 70 is provided directly in front of the opening 72 between opposed legs 60 of the U shaped member 62. Finger 70 receives the top edge of flag 46 to retain the flag in a horizontal position.

Referring now specifically to FIG. 4, the finger 70 comprises the moveable shaft of a vertically oriented solenoid 72 with housing 40 having its coil 74 secured to a bracket 76 suspended from the underside of top face 42. A pair of side by side batteries 78 and 80 are provided within housing 40 and are adapted to be connected in series. As will be seen, when the coil 72 is energized by the series combination of batteries 78 and 80 the finger 70 is electromagnetically moved upward to release the flag 46. The flag is then urged to the vertical position by spring 66.

The top face 42 of housing 40 is preferably provided as a metal plate to serve as a grounding or current return means for the circuitry within the housing. Also the bracket 76 is metal to provide further circuit grounding in view of its connection with the top plate. The remainder of housing 40 is preferably plastic.

As will be apparent from FIG. 4, the lamp 44, the solenoid coil 74 and a buzzer 81, retained in housing 40 below flag 46 adjacent sound passing perforations 83 in the side of housing 40, are each connected electrically in parallel. This parallel combination is connected on one end to the positive electrode 84 for battery 78 and on the other end to the negative electrode 86 for battery 80. The negative electrode 88 for battery 78 and the positive electrode 90 for battery 80 are connected to opposite leads of the cable 80 whereby when the sensor 10 provides continuity between the pair of wires in cable 18 the batteries 78 and 80 are placed in series across the parallel combination of the lamp 44, coil 72 and buzzer 81. Thus, simultaneously the buzzer 81 is sounded, the lamp 44 is lit and the flag 46 is deployed in response to sensor 10.

In utilizing top plate 42 and bracket 76 for grounding battery 78 negative electrode 86 is connected to the bracket by lead 92, one end of buzzer 81 is connected to bracket 76 by lead 94 and one end of coil 74 is connected to the bracket on the underside of the coil. In addition, the lamp socket 94 for lamp 44 being retained in top plate is inherently grounded. The remaining ends of the lamp 44, coil 72 and buzzer 81 are respectively connected to the positive terminal 84 of battery 78 by leads 94, 96 and 98.

Having described the preferred embodiment of my invention in specific detail, it should be apparent that numerous modifications are possible to this detail which still lie within the spirit and scope of my invention. For example, since freezers are frequently located in basements and garages, I contemplate the mounting of alarm unit 14 in a location remote from the freezer which is more likely to apprise the housewife of a temperature failure in the freezer.

Accordingly, reference as to the scope of my invention, should be made to the following claims.

What is claimed is:

1. A temperature alarm apparatus for a refrigerated container having a shelf within said container comprising an electrical temperature sensor having a hook means configured for engaging an edge of said shelf for suspending said sensor from said shelf within said container, a housing having magnetic means for affixing said housing to the outside of said container, cable means for electrically connecting said sensor to said housing, a buzzer carried by said housing, means within said housing for electrically energizing said buzzer in response to said sensor, a flag pivotly mounted on said housing, said flag having a deployed angular position and a cocked angular position, elastic means urging said flag to the deployed position, electrically releasable means for holding said flag in the cocked position, said releasable means including a solenoid electrically connected to said energizing means for deploying said flag in response to said sensor.

2. The apparatus of claim 1 further comprising a lamp on said housing electrically connected to said energizing means for lighting said lamp in response to said sensor.

* * * * *